US012062224B2

(12) United States Patent
Vijay et al.

(10) Patent No.: US 12,062,224 B2
(45) Date of Patent: Aug. 13, 2024

(54) METHOD OF IDENTIFYING SIMILARS IN CLOTHING IMAGES

(71) Applicant: CurioSearch, Milpitas, CA (US)

(72) Inventors: Bharat Vijay, Fremont, CA (US); Jayanth Vijayaraghavan, Palo Alto, CA (US); Arvind Prabhakar, Bengaluru (IN); Ayyar Arun Balavenkatasubramanian, Chennai (IN); Srihari Padmanaban Venkatesan, Chennai (IN)

(73) Assignee: UNISENSE TECH, INC., Milpitas, CA (US)

( * ) Notice: Subject to any disclaimer, the term of this patent is extended or adjusted under 35 U.S.C. 154(b) by 367 days.

(21) Appl. No.: 17/581,035

(22) Filed: Jan. 21, 2022

(65) Prior Publication Data
US 2023/0237768 A1   Jul. 27, 2023

(51) Int. Cl.
*G06V 10/74* (2022.01)
*G06T 11/60* (2006.01)
(Continued)

(52) U.S. Cl.
CPC ............ *G06V 10/761* (2022.01); *G06T 11/60* (2013.01); *G06V 10/245* (2022.01);
(Continued)

(58) Field of Classification Search
CPC ...... G06V 10/761; G06V 20/20; G06V 10/56; G06V 10/255; G06V 10/245; G06T 11/60; G06T 2200/24; G06T 2210/16
See application file for complete search history.

(56) References Cited

U.S. PATENT DOCUMENTS

| 8,103,551 B2 * | 1/2012 | Saul ................. G06N 3/02 705/26.7 |
| 8,798,362 B2 | 8/2014 | Wang et al. |

(Continued)

FOREIGN PATENT DOCUMENTS

| CN | 108614884 A | * 10/2018 |
| CN | 115495603 A | * 12/2022 |

OTHER PUBLICATIONS

Di, Wei, et al. "Style finder: Fine-grained clothing style detection and retrieval." Proceedings of the IEEE Conference on computer vision and pattern recognition workshops. 2013. (Year: 2013).*

*Primary Examiner* — Pinalben Patel
(74) *Attorney, Agent, or Firm* — Vani Moodley, Esq.

(57) ABSTRACT

Described herein is a system and computer implemented method for finding similars for a selected clothing image amongst a set of clothing images in an electronic catalog in an online store serving online customers. An object detection model is applied to extract the clothing section within the clothing images to create a preprocessed image. A first machine learning model is applied on the preprocessed image(s) to convert the colors and textures of said preprocessed image into a first set of vector representations. A second machine learning model is applied on the preprocessed image(s) to convert the shapes of said preprocessed image into a second set of vector representations. Operations of mapping nearest vectors, matching attributes, sorting and ranking are performed, and thereafter similar images are displayed to the online customer.

15 Claims, 16 Drawing Sheets

(51) Int. Cl.
*G06V 10/20* (2022.01)
*G06V 10/24* (2022.01)
*G06V 10/56* (2022.01)
*G06V 20/20* (2022.01)

(52) U.S. Cl.
CPC ............ *G06V 10/255* (2022.01); *G06V 10/56* (2022.01); *G06V 20/20* (2022.01); *G06T 2200/24* (2013.01); *G06T 2210/16* (2013.01)

(56) References Cited

U.S. PATENT DOCUMENTS

| | | | |
|---|---|---|---|
| 10,109,051 B1* | 10/2018 | Natesh | G06V 20/10 |
| 10,321,728 B1* | 6/2019 | Koh | G06T 7/11 |
| 10,529,137 B1* | 1/2020 | Black | G06T 15/04 |
| 2009/0116698 A1 | 5/2009 | Zhang et al. | |
| 2013/0044944 A1* | 2/2013 | Wang | G06F 18/24323 |
| | | | 707/769 |
| 2019/0220694 A1* | 7/2019 | Biswas | G06N 3/08 |
| 2020/0306640 A1* | 10/2020 | Kolen | G06N 3/047 |
| 2023/0177836 A1* | 6/2023 | Solmaz | G06V 20/46 |
| | | | 382/100 |

* cited by examiner

| Index | Attributes |
|---|---|
| 1. | ['embroidered', 'long_sleeve', 'no_dress_length', 'no_neckline', 'cotton', 'conventional'] |
| 2. | ['floral', 'short_sleeve', 'mini_length', 'v_neckline', 'chiffon', 'conventional'] |
| 3. | ['lattice', 'short_sleeve', 'no_dress_length', 'crew_neckline', 'cotton', 'conventional'] |
| 4. | ['graphic', 'sleeveless', 'mini_length', 'crew_neckline', 'cotton', 'conventional'] |
| 5. | ['graphic', 'sleeveless', 'maxi_length', 'crew_neckline', 'cotton', 'conventional'] |
| 6. | ['graphic', 'sleeveless', 'no_dress_length', 'no_neckline', 'cotton', 'conventional'] |
| 7. | ['solid', 'short_sleeve', 'maxi_length', 'no_neckline', 'chiffon', 'conventional'] |
| 8. | ['floral', 'long_sleeve', 'maxi_length', 'crew_neckline', 'cotton', 'conventional'] |
| 9. | ['solid', 'long_sleeve', 'no_dress_length', 'v_neckline', 'cotton', 'conventional'] |
| 10. | ['solid', 'long_sleeve', 'no_dress_length', 'crew_neckline', 'cotton', 'conventional'] |

FIG. 10

| Index | Attributes |
|---|---|
| 1. | ['graphic', 'sleeveless', 'mini_length', 'crew_neckline', 'cotton', 'conventional'] |
| 2. | ['floral', 'short_sleeve', 'mini_length', 'v_neckline', 'chiffon', 'conventional'] |
| 3. | ['floral', 'sleeveless', 'no_dress_length', 'no_neckline', 'chiffon', 'conventional'] |
| 4. | ['floral', 'long_sleeve', 'no_dress_length', 'crew_neckline', 'chiffon', 'conventional'] |
| 5. | ['solid', 'long_sleeve', 'mini_length', 'v_neckline', 'denim', 'conventional'] |
| 6. | ['lattice', 'short_sleeve', 'no_dress_length', 'crew_neckline', 'cotton', 'conventional'] |
| 7. | ['floral', 'long_sleeve', 'no_dress_length', 'v_neckline', 'cotton', 'conventional'] |
| 8. | ['floral', 'short_sleeve', 'no_dress_length', 'crew_neckline', 'cotton', 'conventional'] |
| 9. | ['solid', 'short_sleeve', 'no_dress_length', 'crew_neckline', 'cotton', 'conventional'] |
| 10. | ['graphic', 'sleeveless', 'maxi_length', 'crew_neckline', 'cotton', 'conventional'] |

FIG. 12

METHOD OF IDENTIFYING SIMILARS IN CLOTHING IMAGES

BACKGROUND

This invention in general relates to a method of e-commerce and specifically to selection of items.

Consider an electronic catalog presented on an online store to a consumer. A consumer may desire to identify apparel similar looking to a given apparel of choice, either displayed individually or donned by a user.

However, customers do not seek exact matches, but seek "similar" styles. The existing solutions attempt to provide visually closely matching options, trying to reach image "exactness", but do not provide true similars, and with insufficient accuracy. The current art of identifying similars is non intuitive and is at the coarse level.

SUMMARY OF THE INVENTION

The method and system of this invention addresses the above unmet need of identifying a set of similar looking clothes in an electronic catalog given an input of an image of a donned clothing.

Described herein is a system and computer implemented method for finding similars for a selected clothing image amongst a set of clothing images in an electronic catalog in an online store serving online customers. Apply an object detection model to extract the clothing section within the clothing images to create a preprocessed image.

Apply a first machine learning model on the preprocessed image(s) to convert the colors and textures of the preprocessed image into a first set of vector representations and thereafter store the first set of vector representations in a vector database.

Apply a second machine learning model on the preprocessed image(s) to convert the shapes of said preprocessed image into a second set of vector representations and thereafter store the second set of vector representations in the vector database.

Map and identify n nearest vectors of the first set of vectors with the vector of the selected image from said vector database. Map and identify m nearest vectors of the second set of vectors with the vector of the selected image from the vector database.

Identify n and m images corresponding to the n and m nearest vectors 108. Apply an attribute extraction model to identify clothing attributes of the selected image. Apply an attribute extraction model to identify clothing attributes of the identified n and m images. Match identified attributes between the selected image and the identified n and m images.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for identifying similars for a selected image amongst a set of clothing images in an electronic catalog. The system also includes a processor; and a memory containing instructions, when executed by the processor, configure the system to: apply a object detection model to extract a clothing section within said clothing images to create a preprocessed image; apply a first machine learning model on said preprocessed image(s) to convert colors and textures of said preprocessed image into a first set of vector representations and thereafter store said first set of vector representations in a vector database; apply a second machine learning model on said preprocessed image(s) to convert shapes of said preprocessed image into a second set of vector representations and thereafter store said second set of vector representations in said vector database; map and identify n nearest vectors of said first set of vectors with the vector of said selected image from said vector database; map and identify m nearest vectors of said second set of vectors with the vector of said selected image from said vector database. The system also includes identify n and m images corresponding to said n and m nearest vectors; apply an attribute extraction model to identify clothing attributes of said selected image, apply an attribute extraction model to identify clothing attributes of said identified n and m images, match attributes between attributes of said selected image and attributes of said identified n and m images, sort and rank said identified n and m images based on said match, and display on a user interface said sorted and ranked n and m images. Other embodiments of this aspect include corresponding computer systems, apparatus, and computer programs recorded on one or more computer storage devices, each configured to perform the actions of the methods.

Implementations may include one or more of the following features. The system where said clothing attributes may include one or more of design of collar, shape of collar, shape of sleeve, and text and numbering content of said preprocessed image. Said first machine learning model is a bootstrap your own latent (BYOL) model. Said BYOL model is trained to create different views of the same image utilizing a random cropping augmentation technique. Said BYOL model is trained to create different views of the same image utilizing a left-right flip augmentation technique. Said BYOL model is trained to create different views of the same image utilizing one or more of a color jittering and color dropping augmentation technique. Said second machine learning model is a non-parametric instance-level discrimination model. Implementations of the described techniques may include hardware, a method or process, or computer software on a computer-accessible medium.

One general aspect includes a method for identifying similars for a selected clothing image amongst a set of clothing images in an electronic catalog. The method also includes applying a object detection model to extract a clothing section within said clothing images to create a preprocessed image; applying a first machine learning model on said preprocessed image(s) to convert colors and textures of said preprocessed image into a first set of vector representations and thereafter store said first set of vector representations in a vector database, applying a second machine learning model on said preprocessed image(s) to convert shapes of said preprocessed image into a second set of vector representations and thereafter store said second set of vector representations in said vector database, applying a non-parametric instance-level discrimination model to generate a second set of vector representation of clothing images in the electronic catalog to determine a second set of similar images, mapping and identifying n nearest vectors of said first set of vectors with the vector of said selected image from said vector database, mapping and identifying m nearest vectors of said second set of vectors with the vector of said selected image from said vector database. The method also includes identifying n and m images corresponding to said n and m nearest vectors; applying an attribute extraction model to identify clothing attributes of said selected image, applying an attribute extraction model to identify clothing attributes of said identified n and m images, matching attributes between attributes of said selected image and attributes of said identified n and m images, sorting and ranking said identified n and m images based on said match, and displaying on a user interface said sorted and ranked n and m images. Other embodiments of this aspect include corresponding computer systems, apparatus, and computer programs recorded on one or more computer storage devices, each configured to perform the actions of the methods.

Implementations may include one or more of the following features. The method where said clothing attributes may include one or more of design of collar, shape of collar, shape of sleeve, and text and numbering content of said preprocessed image. Said first machine learning model is a bootstrap your own latent (BYOL) model. Said BYOL model is trained to create different views of the same image utilizing a random cropping augmentation technique. Said BYOL model is trained to create different views of the same image utilizing a left-right flip augmentation technique. Said BYOL model is trained to create different views of the same image utilizing one or more of a color jittering and color dropping augmentation technique. Said second machine learning model is a non-parametric instance-level discrimination model. Implementations of the described techniques may include hardware, a method or process, or computer software on a computer-accessible medium.

BRIEF DESCRIPTION OF DRAWINGS

FIG. 10 list the attributes of the images, with images counted from left to right.

FIG. 12 lists their attributes from the attribute classifier model, images counted from left to right.

DETAILED DESCRIPTION

Figure 1:
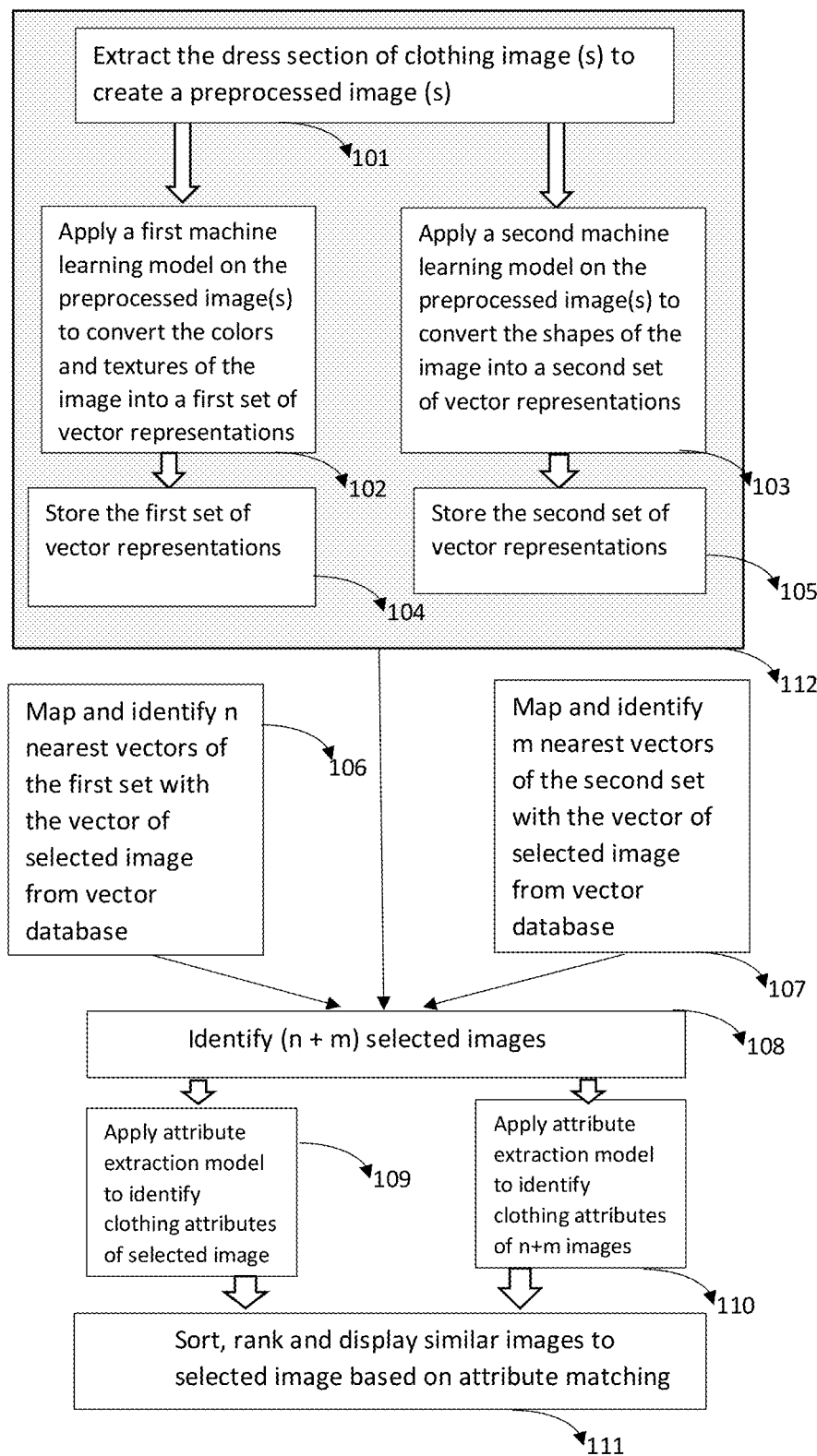
FIG. 1 illustrates the method of identifying a set of similar looking clothes in an electronic catalog given an input of an image of a donned clothing.

In the following description, for purposes of explanation, numerous specific details are set forth in order to provide a thorough understanding of the invention. It will be apparent, however, to one skilled in the art that the invention may be practiced without these specific details. In other instances, structures and devices are shown in block diagram form only in order to avoid obscuring the invention.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Described herein is a system and computer implemented method for finding similars for a selected clothing image amongst a set of clothing images in an electronic catalog in an online store serving online customers. Apply an object detection model to extract the clothing section within the clothing images to create a preprocessed image 101.

Apply a first machine learning model 102 on the preprocessed image(s) to convert the colors and textures of said preprocessed image into a first set of vector representations and thereafter store the first set of vector representations in a vector database.

Apply a second machine learning model 103 on the preprocessed image(s) to convert the shapes of said preprocessed image into a second set of vector representations and thereafter store the second set of vector representations in the vector database.

Map and identify n nearest vectors 106 of the first set of vectors with the vector of the selected image from the vector database. Map and identify m nearest vectors of the second set of vectors 107 with the vector of the selected image from the vector database.

Identify n and m images corresponding to the n and m nearest vectors 108. Apply an attribute extraction model to identify clothing attributes of said selected image 109.

Apply an attribute extraction model to identify clothing attributes of the identified n and m images 110. Match identified attributes between the selected image and the identified n and m images;

Sort and rank the identified n and m images based on said match. Display on a user interface the ranked n and m images to the online customers 111.

The method of extraction of the dress section within the image to create a preprocessed image is described in detail below.

Apply an attribute extraction model to identify the clothing attributes of the donned clothing. Exemplarily, the clothing attributes comprises one or more of colour, sleeve length, dress category, dress length and other clothing style attributes.

The method of extraction of the dress section within the image to create a preprocessed image is described in detail below.

The method of extraction through object detection locates, identifies, and classifies a singular object, or identifies different parts of the object(s) in an image/video. The identified objects are represented using a bounding box (a rectangular box) marking the object's location. The region proposal-based and regression/classification-based methods are applied for object(s) detection.

In both region proposal-based and regression/classification-based methods, predict the following:
Class Name
    bx, by—bounding box center coordinates
    bw—bounding box width
    bh—bounding box height A regression-classification based model, YOLO (You Only Look Once) is advantageously applied for object detection for cloth category detection as it provides faster inference and higher accuracy.

Object detection in YOLO is conducted as a regression problem and provides the class probabilities of the detected images. The YOLO algorithm uses convolutional neural networks (CNN) to detect objects in real-time and requires only a single forward propagation through a neural network.

The YOLO algorithm works using the following three techniques (a) Residual blocks (b) Bounding box regression (c) Intersection Over Union (IOU) and Non-max suppression.

Figure 2A:
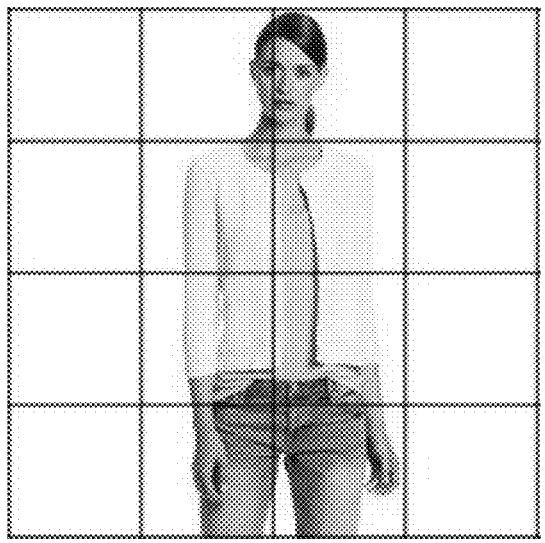
FIG. 2A illustrates the application of residual blocks to a clothed person.

The residual block technique is described herein. FIG. 2A illustrates the application of residual blocks to a clothed person.

The residual blocks algorithm divides the image into various grids. Each grid is a square of size 'S.' Every grid cell will detect objects that appear within them. For example, if an object center appears within a specific grid cell, this cell will be responsible for detecting it.

Figure 2B:
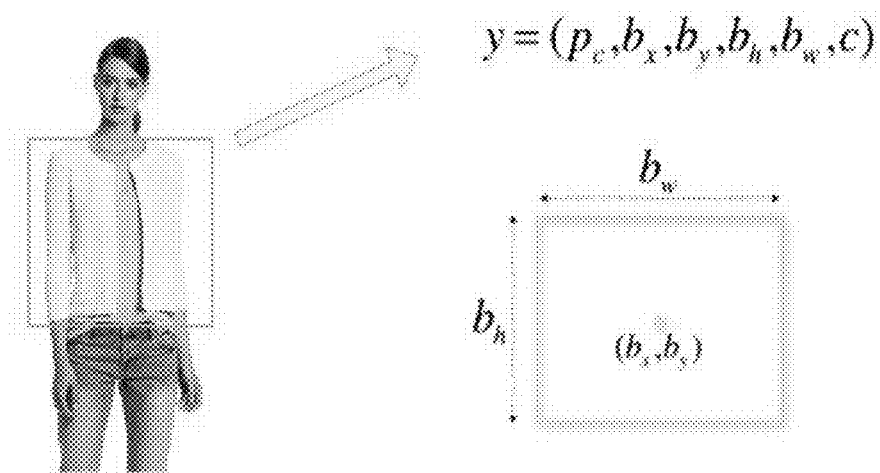
FIG. 2B illustrates the application of the bounding box to a clothed person.

The bounding box regression technique is described herein. FIG. 2B illustrates the application of the bounding box to a clothed person. Every bounding box in the image consists of the following attributes:
    pc—the probability of occurrence of a particular class inside the bounding box
    bx, by—bounding box center coordinates
    bw—bounding box width
    bh—bounding box height•
    c—the class name An outline represents the bounding box. YOLO then performs regression to find the bounding box dimensions and classification to find the class of the object.

Figure 3A:
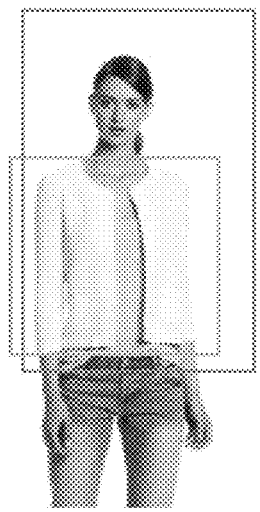
FIG. 3A illustrates an example of the Intersection over union (IOU) method.

The intersection Over Union and Non-max suppression model is described herein. FIG. 3A illustrates an example of the Intersection over union (IOU) method. Intersection over union (IOU) describes how boxes overlap. YOLO uses IOU to provide an output box that surrounds the objects perfectly. Each grid cell is responsible for predicting the bounding boxes and their confidence scores. The IOU equals 1 if the predicted bounding box is the same as the actual box. This mechanism eliminates bounding boxes that are not equal to the real bounding box.

There are two bounding boxes in the FIG. 3A: a larger box and a smaller box. The smaller box is the predicted box, while the larger box is the real box. Intersection over Union, will calculate the area of the intersection over union of these two boxes. That area will be: IoU=Area inside yellow box/Area inside green box. If IoU is greater than 0.5, the prediction is satisfactory. Exemplarily, 0.5 is an arbitrary threshold that changes according to a specific problem. Intuitively, higher the threshold, the better the accuracy of the predictions.

Figure 3B:
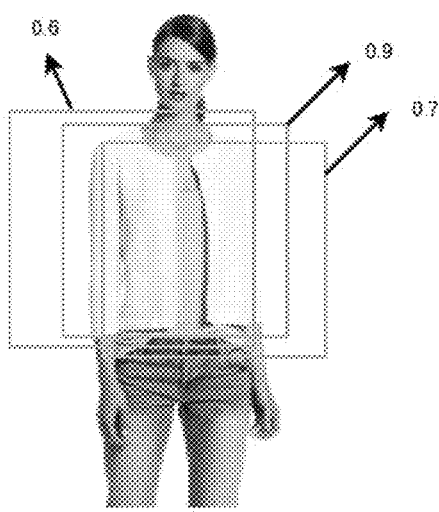
FIG. 3B illustrates the detection of an object multiple times.

In some cases, object detection algorithms may detect an object multiple times rather than detecting it once. FIG. 3B illustrates the detection of an object multiple times. The numbers in the figure are the probability pc, the probability of occurrence of a particular class inside the bounding box. To avoid multiple detections, a Non-Max Suppression technique is applied. The Non-max suppressing technique model will select the box with maximum probability and suppress the close-by boxes with non-max probabilities.

A combination of the methods of the residual block technique, bounding box regression technique and intersection Over Union and Non-max suppression model is described herein. First, the algorithm grids the image into cells. Each grid cell forecasts bounding boxes and provides their confidence scores. The cells predict the class probabilities to establish the class of each object.

Figure 4A:
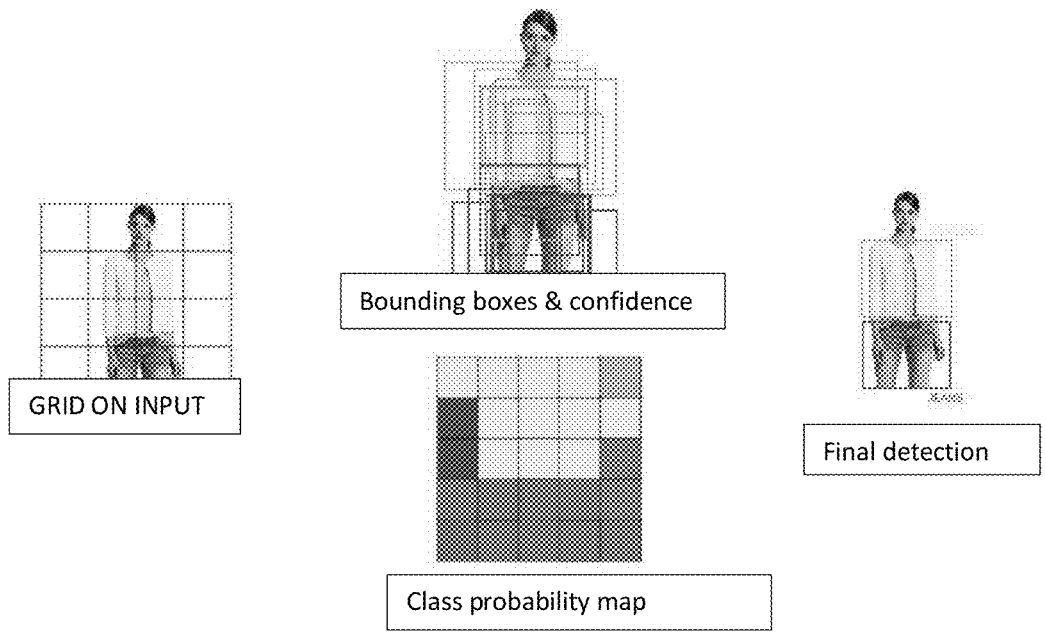
FIG. 4A illustrates two classes of objects: a blazer and a jeans.
Figure 4B:
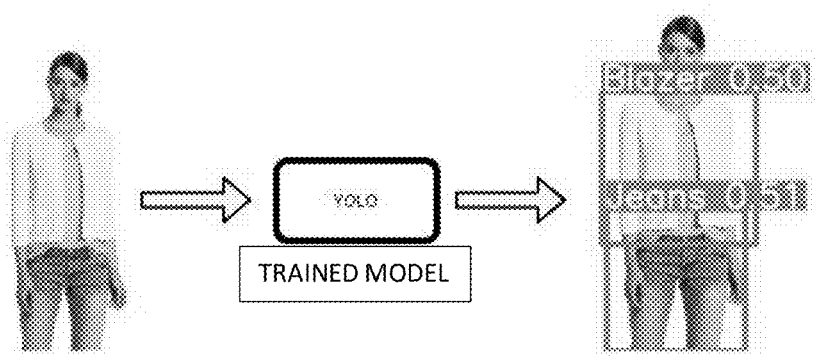
FIG. 4B illustrates the trained results of the object detection model.

FIG. 4A illustrates a category detection model using the above combination of methods. In FIG. 4B, there are at least two classes of objects: a blazer and jeans. All the predictions are made simultaneously using a single convolutional neural network. Intersection over union ensures that the predicted bounding boxes are equal to the real boxes of the objects. The non-max suppression selects the maximum probable box. The final detection will consist of unique bounding boxes that fit the objects perfectly.

An exemplary workflow is illustrated below for the object detection on the subset of a Deepfashion dataset.

The subset includes 28 different fashion items (Exemplary, and not restrictive). ['Blouse', 'Blazer', 'Tee', 'Tank', 'Top', 'Sweater', 'Hoodie', 'Cardigan', 'Jacket', 'Skirt', 'Shorts', 'Jeans', 'Joggers', 'Sweatpants', 'Cutoffs', 'Sweatshorts', 'Leggings', 'Dress', 'Romper', 'Coat', 'Kimono', 'Jumpsuit', 'Kurta', 'Pajamas', 'Patiala', 'Lehenga', 'Choli', 'Chudidar']

Train the YOLO model on the above subset.

The trained model is then used for inference.

The method of creating a vector representation of the extracted images from the electronic catalog is described below.

The method of applying a BYOL algorithm to capture salient design features to generate a vector representation of clothing images in the catalog to arrive at similars of the salient design features, is described herein.

BYOL is a self-supervised learning model for image representations achieving better results than contrastive methods, without using negative pairs. BYOL is computationally less expensive than generative methods. BYOL applies an online and a target neural network to learn the image representation.

The prediction process implemented by the BYOL model is applied to the online network that serves the purpose of a learning network.

BYOL finds the similarity between various views of an image. This similarity detection helps the BYOL model understand the image's patterns and differentiates it from other images.

Described below is the implementation of a BYOL model on a clothing dataset. Consider an extensive collection of T-shirts. Train BYOL to learn the representation for every image in the dataset. The quantitative values described below are only exemplary and not restrictive.

Figure 5A:
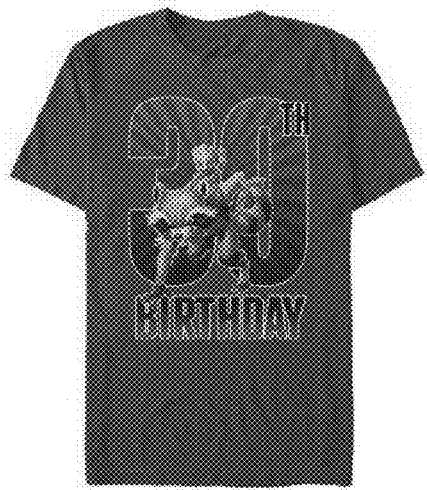
FIGS. 5A, 5B and 5C illustrate a sample, random cropped, side flipped image respectively.
Figure 5B:
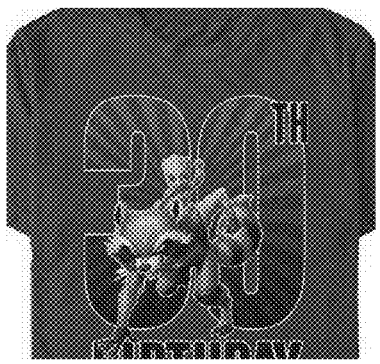
Figure 5C:
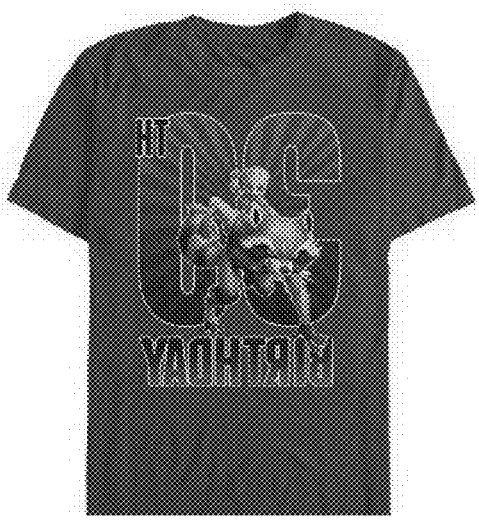

FIGS. 5A, 5B, and 5C illustrate a sample, random cropped, side flipped image respectively.

Sample an image from the dataset (FIG. 5A).

Create two different views of the same image utilizing various augmentation techniques.

Random cropping: A random patch of the image is selected, with an area uniformly sampled between 8% and 100% of the original image, and an aspect ratio logarithmically sampled between 3/4 and 4/3. This patch is then resized to the target size of 224×224 using bicubic interpolation.

The image is Left-right flipped, as illustrated in FIG. 5C.

Figure 6A:
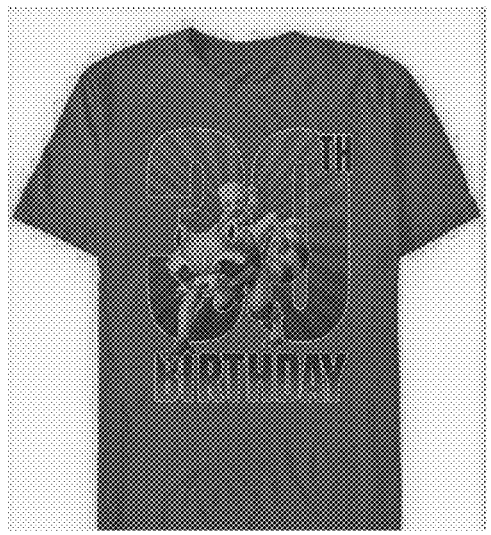
FIGS. 6A and 6B illustrate the image processed with color jittering and color dropping respectively.
Figure 6B:
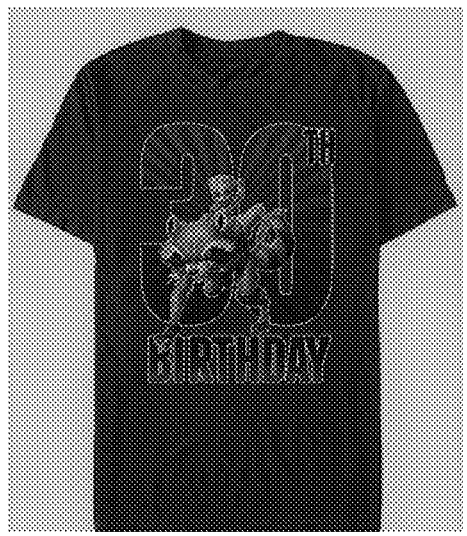

FIGS. 6A and 6B illustrate the image processed with color jittering and color dropping respectively.

Color jittering: The brightness, contrast, saturation and hue of the image are shifted by a uniformly random offset applied on all the same image pixels.

Color dropping: An optional conversion to grayscale. When applied color dropping is applied, output intensity for a pixel (r, g, b) corresponds to its luma component, computed as 0.2989r+0.5870 g+0.1140b.

Choose the encoder to use with the BYOL model. The encoder can be any residual network architecture, for example Resnet-18 or Resnet 50. The choice of the encoder will decide the embedding size. For example, Resnet-18 transforms an image into an embedding vector of size 1024, while Resnet-50 transforms an image into an embedding vector of size 2048.

Figure 7:
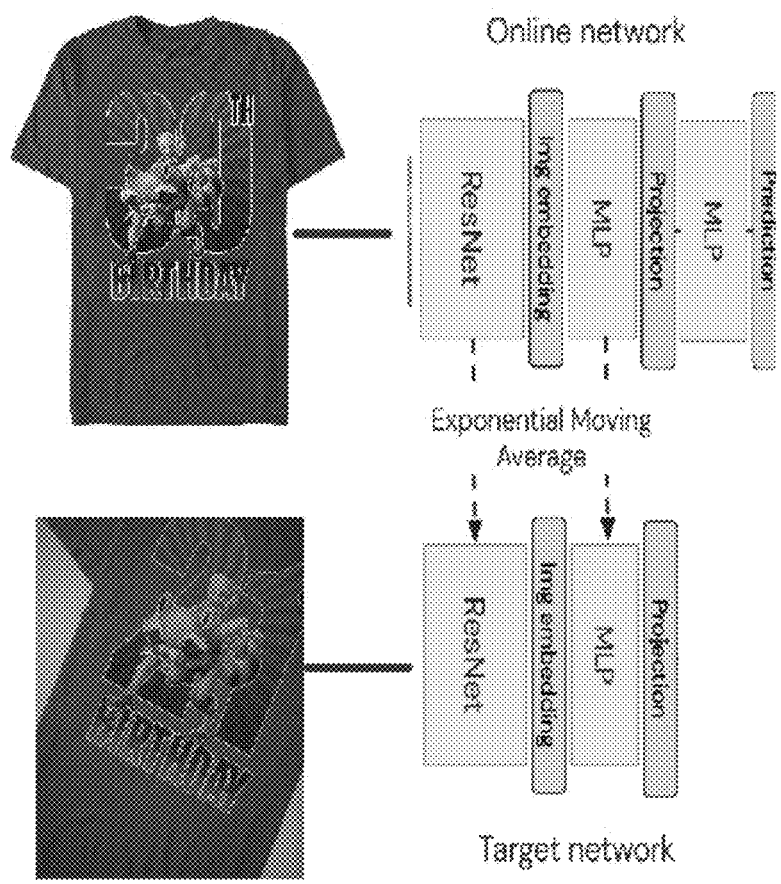
FIG. 7 illustrates the BYOL training process on a clothing image.

Train the BYOL model as follows. FIG. 7 illustrates the BYOL training process on a clothing image.

The above processes repeats for every image in the dataset. The online network weights get tuned during each step, thereby minimizing the prediction error between two different views of the same image. At the end of the training, store only the weights of the encoder (model), using which the representation for any new test image is determined.

Figure 8:
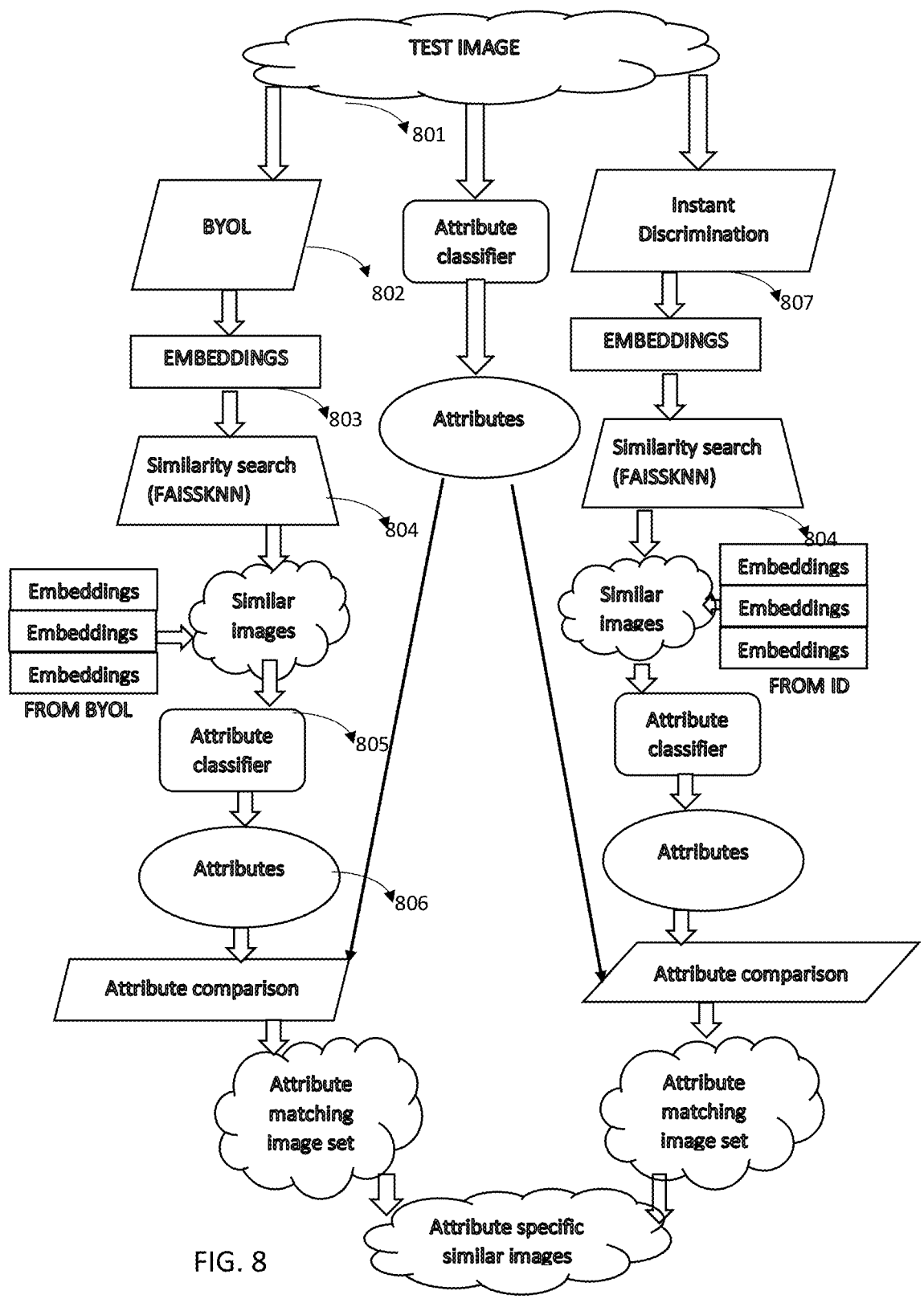
FIG. 8 illustrates the workflow for generating attribute specific similar images.

FIG. 8 illustrates the method of identifying similar images from a dataset given a test image.

The following steps highlight the method of finding similar images from the dataset given a test image.

Find the embedding vector for every image in the dataset by performing a forward pass on the trained BYOL encoder 802 using all images from the dataset.

Apply Facebook AI Similarity Search (FAISS), a library for efficient similarity search and clustering of dense vectors. Create a FAISS index 804 from the embedding 803. This index is a sorted version of the embedding according to a metric (such as Euclidean distance).

Given a test image 801, find the embedding 803 and quickly locate the similar images 806 from the created FAISS index 805. If required, add the new image to the dataset and the embedding to the FAISS index 804.

For a given a set of vectors xi in dimension 'd', FAISS builds a data structure in RAM from it. After constructing the data structure, given a new vector x in size 'd', FAISS performs the following operation:

$$\arg\min_i \|xi-x\|$$

where |·| is the Euclidean distance ( ). FAISS essentially finds the index 'i', which contains an embedding vector closest (similar) to the test image's embedding vector. The FAISS index can then be stored and used for finding similar images.

The second machine learning model 103, exemplarily is a non-parametric instance-level discrimination algorithm. Applying a non-parametric instance-level discrimination algorithm reduces the number of classes by approximating the full softmax distribution with noise-contrastive estimation, and by resorting to a proximal regularization method to stabilize the learning process.

Features for each instance are stored in a discrete memory bank, rather than as weights in a network. The non-parametric instance-level discrimination model is an unsupervised feature learning approach with instance-level discrimination, exemplarily described by Zhirong Wu, Yuanjun Xiong, Stella Yu, Dahua Lin, "Unsupervised Feature Learning via non-parametric instance-level discrimination", Jun. 1, 2018, https://openaccess.thecvf.com/content_cvpr_2018/CameraReady/0801.pdf.

The method of merging and presenting the first set and second set of similar images is described herein.

Sort, rank, and present the first set of similar images and second set of similar images. Those images amongst said first and second of images that share the highest number of common attributes with the image of donned clothing is presented with a higher ranking.

The workflow involved in finding similar fashion images based on their attribute values is described below. Exemplification of the steps is not meant to be restrictive.

Representation learning is performed on the dataset via BYOL and Instance discrimination. Get two different embedding vectors set (one for each model). Create a FAISS index from the embeddings. The index is a sorted version of the embeddings according to a metric (Euclidean distance).

FIG. 7 illustrates the generation of embedding vectors. Given a test image, perform attribute classification to get the attributes of the image. Find two representations for the test image using both trained models. Get ten similar images for each representation using the similarity search algorithm of FAISS. (Totally 20 images). Separately run the two sets of ten images each through an attribute classification algorithm. Collect images that match at least 3 out of 6 attributes. (Consider two sets with less than 10 images each). From the collected sets, choose 5 or 6 images with maximum attribute match count. In a worst-case scenario where it is not feasible to get 5 images after attribute matching, reduce the number of attributes to match from 3 to 2, and then proceed. Return these images as attribute-specific similar fashion images for the test image.

The various attributes and their respective values used for classification and comparison are listed below.

Texture: floral, graphic, striped, embroidered, pleated, solid, lattice

Sleeve: long sleeve, short sleeve, sleeveless.

Dress length: max length, min length, not dress

Neckline: crew neckline, V-neckline, Square neckline, No neckline

Fabric: denim, chiffon, cotton, leather, faux, knit

Size: tight, loose, conventional

FIG. 8 illustrates the workflow of generating attribute specific similar images.

Described herein is an example of an implementation of the workflow on a Shopify Dataset, which consists of 2039 fashion images.

Figure 9:
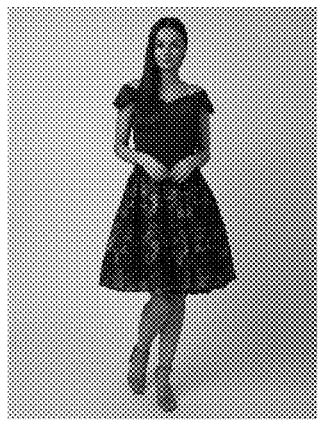
FIG. 9A illustrates a test image.
FIG. 9B illustrates ten images similar to the test/query image, based on embeddings produced by BYOL model.
Figure 9:

Find two embedding sets for this dataset—one by BYOL 802 and another by Instance Discrimination 807. Call them embBYOL and embID. Consider a test image 801 as illustrated in FIG. 9A. Find its representation by passing it through the BYOL and ID models, call them rBYOL and rID. 4.

Perform attribute classification to get the attributes of the image. The following are the attributes for the image ['floral', 'short_sleeve', 'mini_length', 'crew_neckline', 'cotton']

From embBYOL search for representations similar to rBYOL. FIG. 9B illustrates ten images similar to the test/query image, based on embeddings produced by BYOL model.

Pass the above ten images through the attribute classifier model 805 to find their attributes 806. FIG. 10 list the attributes of the images, with images counted from left to right.

Collect images that match at least three attributes in common with the query image from the above images. From the table illustrated in FIG. 10, infer that four images pass this condition. Call this collection simBYOL Similarly, from embID search for representations similar to rID.

Figure 11:
FIG. 11 illustrates ten images similar to the test/query image based on embeddings produced by ID model.

FIG. 11 illustrates ten images similar to the test/query image based on embeddings produced by ID model.

Pass the above ten images through the attribute classifier model to find their attributes. FIG. 12 lists their attributes, images counted from left to right.

Collect images that match at least three attributes in common with the query image from the above images.

Figure 13A:
FIG. 13A illustrates images that match at least three attributes in common with the query image.
Figure 13:
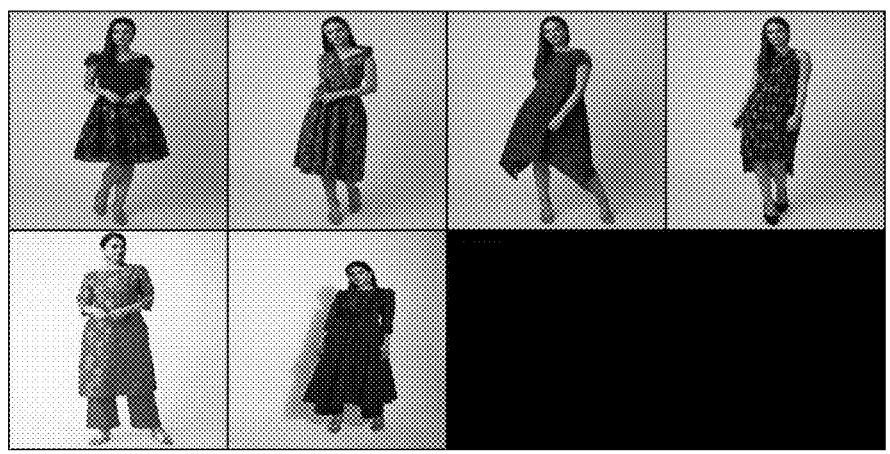
FIG. 13B illustrates the selected images that are present in both sets.

FIG. 13A illustrates images that match at least three attributes in common with the query image.

From the table illustrated in FIG. 12, it can be inferred that five images pass this condition. Call this collection simID From simBYOL and simID first select the images that are present in both sets. Call this collection simboth. If the number of images in this set is less than five, select the remaining images (to add up to five) based on the highest matching attributes count. For example if simBYOL has an image with 4 matching attributes but it is not in simboth, then add it to simboth.

FIG. 13B illustrates the selected images that are present in both sets.

Figure 14:
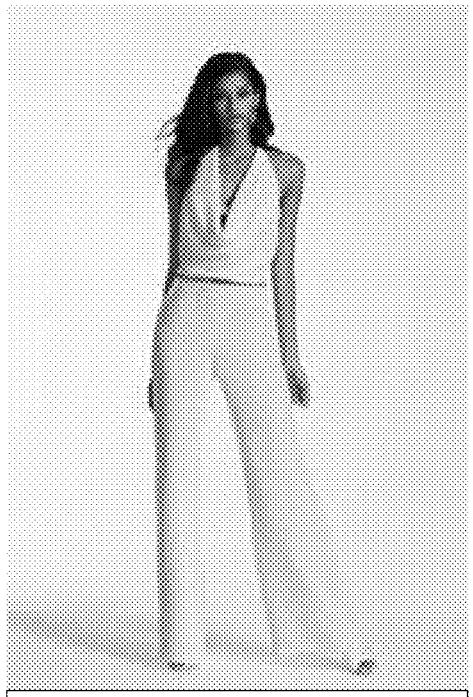
FIG. 14 illustrates a test image with a listing of attributes.
Figure 15:
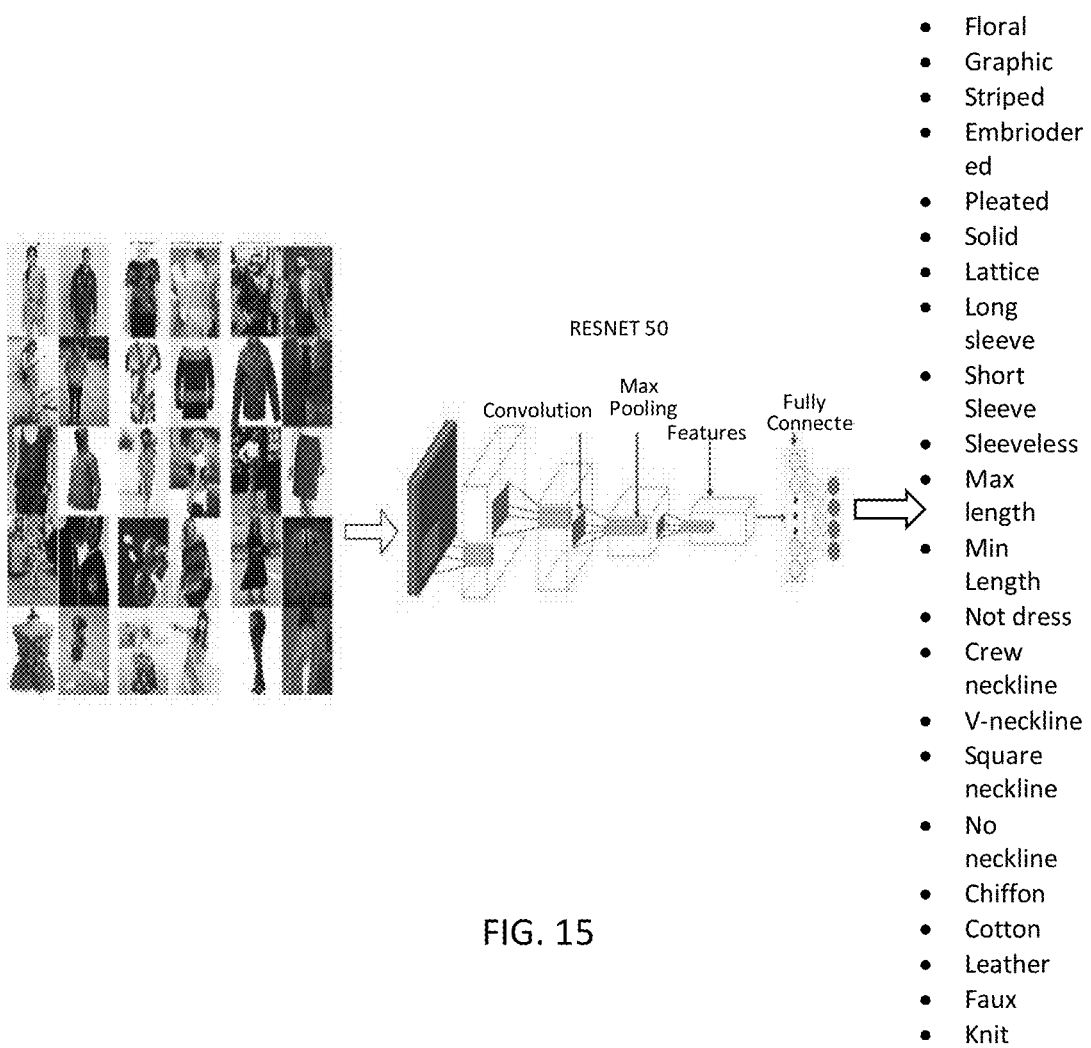
FIG. 15 illustrates the training for attributes.

The process of attribute classification is described herein. Attribute classification is considered as a multi-label classification problem. Exemplarily, there are 26 classes in total. Each data in the dataset consists of an image with the corresponding attribute label. FIG. 14 illustrates a test image with a listing of attributes. FIG. 15 illustrates the training for attributes.

Perform supervised learning using the Resnet 50 architecture, and save the trained model. Given a new image, the model outputs the probability of each class.

Figure 16:
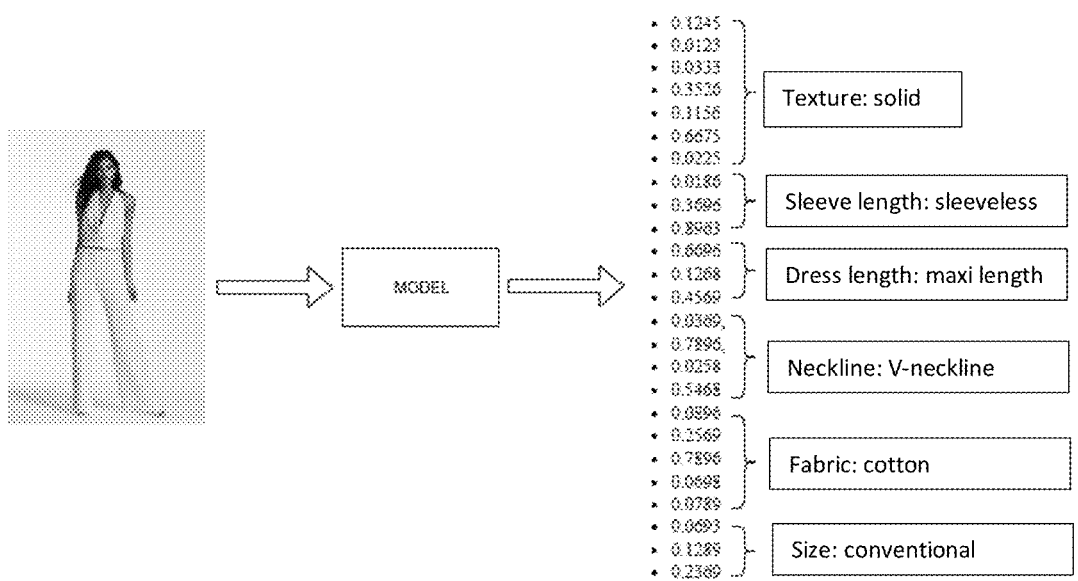
FIG. 16 illustrates the probabilities based on the attributes.

FIG. 16 illustrates the probabilities based on the attributes. There are 26 classes, and only six attributes are required. Therefore, first group these probabilities based on the attribute they belong to, and then choose the maximum value in each group.

The processing steps described above may be implemented as modules or models. As used herein, the term "module" might describe a given unit of functionality that can be performed in accordance with one or more embodiments of the present invention. As used herein, a module might be implemented utilizing any form of hardware, software, or a combination thereof. For example, one or more processors, controllers, ASICs, PLAS, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. After reading this description, it will become apparent to a person skilled in the relevant art how to implement the invention using other computing modules or architectures.

In general, the modules/routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices.

Modules might be implemented using a general-purpose or special-purpose processing engine such as, for example, a microprocessor, controller, or other control logic. In the illustrated example, the modules could be connected to a bus, although any communication medium can be used to facilitate interaction with other components of computing modules or to communicate externally.

The computing server might also include one or more memory modules, simply referred to herein as main memory. For example, preferably random access memory (RAM) or other dynamic memory, might be used for storing information and instructions to be executed by processor. Main memory might also be used for storing temporary variables or other intermediate information during execution of instructions to be executed by a processor. Computing module might likewise include a read only memory ("ROM") or other static storage device coupled to bus for storing static information and instructions for processor.

The database module might include, for example, a media drive and a storage unit interface. The media drive might include a drive or other mechanism to support fixed or removable storage media.

In alternative embodiments, the database modules might include other similar instrumentalities for allowing computer programs or other instructions or data to be loaded into the computing module. Such instrumentalities might include, for example, a fixed or removable storage unit and an interface.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for identifying similars for a selected image amongst a set of clothing images in an electronic catalog, comprising:
    a processor; and
    a memory containing instructions, when executed by the processor, configure the system to:
        apply an object detection model to extract a clothing section within said clothing images to create a preprocessed image;
        apply a first machine learning model on said preprocessed image(s) to convert colors and textures of said preprocessed image into a first set of vector representations and thereafter store said first set of vector representations in a vector database;
        apply a second machine learning model on said preprocessed image(s) to convert shapes of said preprocessed image into a second set of vector representations and thereafter store said second set of vector representations in said vector database;
        map and identify a set of n nearest vectors of said first set of vectors with the vector of said selected image from said vector database;
        map and identify a set of m nearest vectors of said second set of vectors with the vector of said selected image from said vector database;
        identify a set of n images corresponding to said set of n nearest vectors;
        identify a set of m images corresponding to said set of m nearest vectors;
        apply an attribute extraction model to identify clothing attributes of said selected image;
        apply an attribute extraction model to identify clothing attributes of each image in each set of said identified sets of n and m images;
        match attributes between said identified clothing attributes of said selected image and said identified clothing attributes of each image in each set of said identified sets of n and m images;
        sort and rank, based on said match, each image of said identified set of n images and each image of said identified set of m images; and
        display on a user interface said sorted and ranked sets of n and m images.

2. The system of claim 1, wherein said clothing attributes comprises one or more of design of collar, shape of collar, shape of sleeve, and text and numbering content of said preprocessed image.

3. The system of claim 1, wherein said first machine learning model is a Bootstrap Your Own Latent (BYOL) model.

4. The system of claim 3, wherein said BYOL model is trained to create different views of the same image utilizing a random cropping augmentation technique.

5. The system of claim 3, wherein said BYOL model is trained to create different views of the same image utilizing a left-right flip augmentation technique.

6. The system of claim 3, wherein said BYOL model is trained to create different views of the same image utilizing one or more of a color jittering and color dropping augmentation technique.

7. The system of claim 1, wherein said second machine learning model is a non-parametric instance-level discrimination model.

8. The method of claim 1, wherein the system is further configured to:
    select images common to said sorted and ranked sets of n and m images; and
    display said selected common images on said user interface.

9. A method for identifying similars for a selected clothing image amongst a set of clothing images in an electronic catalog, comprising:
    applying a object detection model to extract a clothing section within said clothing images to create a preprocessed image;
    applying a first machine learning model on said preprocessed image(s) to convert colors and textures of said preprocessed image into a first set of vector representations and thereafter store said first set of vector representations in a vector database;
    applying a second machine learning model on said preprocessed image(s) to convert shapes of said preprocessed image into a second set of vector representations and thereafter store said second set of vector representations in said vector database;
    applying a non-parametric instance-level discrimination model to generate a second set of vector representation of clothing images in the electronic catalog to determine a second set of similar images;
    mapping and identifying a set of n nearest vectors of said first set of vectors with the vector of said selected image from said vector database;

mapping and identifying a set of m nearest vectors of said second set of vectors with the vector of said selected image from said vector database;
identifying a set of n images corresponding to said set of n nearest vectors;
identifying a set of m images corresponding to said set of m nearest vectors;
applying an attribute extraction model to identify clothing attributes of said selected image;
applying an attribute extraction model to identify clothing attributes of each image in each set of said identified sets of n and m images;
matching attributes between said identified clothing attributes of said selected image and said identified clothing attributes of each image in each set of said identified sets of n and m images;
sorting and ranking, based on said match, each image of said identified set of n images and each image of said identified set of m images; and
displaying on a user interface said sorted and ranked sets of n and m images.

10. The method of claim 9, wherein said clothing attributes comprises one or more of design of collar, shape of collar, shape of sleeve, and text and numbering content of said preprocessed image.

11. The method of claim 9, wherein said first machine learning model is a Bootstrap Your Own Latent (BYOL) model.

12. The method of claim 11, wherein said BYOL model is trained to create different views of the same image utilizing a random cropping augmentation technique.

13. The method of claim 11, wherein said BYOL model is trained to create different views of the same image utilizing a left-right flip augmentation technique.

14. The method of claim 11, wherein said BYOL model is trained to create different views of the same image utilizing one or more of a color jittering and color dropping augmentation technique.

15. The method of claim 9, wherein said second machine learning model is a non-parametric instance-level discrimination model.

* * * * *